United States Patent
Whiteaway

(10) Patent No.: US 7,805,082 B1
(45) Date of Patent: Sep. 28, 2010

(54) OPTICAL LASER CONTROL FOR OPTICAL COMMUNICATIONS SYSTEMS

(75) Inventor: James Edward Whiteaway, Sawbridgeworth (GB)

(73) Assignee: Ciena Corporation, Linthicum, MD (US)

(*) Notice: Subject to any disclaimer, the term of this patent is extended or adjusted under 35 U.S.C. 154(b) by 607 days.

(21) Appl. No.: 10/946,224

(22) Filed: Sep. 21, 2004

(51) Int. Cl.
*H04B 10/12* (2006.01)
*H04B 10/00* (2006.01)

(52) U.S. Cl. .............. 398/147; 398/159; 398/192; 398/194; 398/186

(58) Field of Classification Search ............... 398/192, 398/193, 194, 198, 158, 159, 147, 182, 183, 398/186, 195, 196, 197, 185, 148; 372/29.01, 372/29.011, 29.015, 29.02
See application file for complete search history.

(56) References Cited

U.S. PATENT DOCUMENTS

| | | | | |
|---|---|---|---|---|
| 5,060,310 A | * | 10/1991 | Frisch et al. ............... 398/193 |
| 5,062,117 A | * | 10/1991 | Anthon et al. ............... 372/75 |
| 6,028,870 A | * | 2/2000 | Deutsch et al. ............... 372/25 |
| 6,629,638 B1 | * | 10/2003 | Sanchez ..................... 235/454 |
| 7,466,925 B2 | * | 12/2008 | Iannelli ..................... 398/182 |
| 2005/0254825 A1 | * | 11/2005 | Bai et al. .................... 398/155 |
| 2005/0271394 A1 | * | 12/2005 | Whiteaway et al. ......... 398/188 |
| 2006/0078336 A1 | * | 4/2006 | McNicol et al. ............ 398/147 |

* cited by examiner

*Primary Examiner*—M. R. Sedighian
(74) *Attorney, Agent, or Firm*—Christopher & Weisberg, P.A.

(57) ABSTRACT

An optical communications system comprises a transmitter, a receiver and an optical communications link between the transmitter and receiver. The transmitter comprises a current-driven directly modulated laser for providing a modulated optical signal and a current controller for controlling the current waveform applied to the laser. The current waveform applied to the laser is determined to compensate for the effects of the laser non-linearities and the fiber chromatic dispersion. This system applies pre-compensation to the directly modulated laser input current waveform to provide both pre-compensation for chromatic dispersion and compensation for the non-linearities of the directly modulated laser. These are two of the main limiting factors in providing a low cost high data rate and long reach optical communications system.

10 Claims, 7 Drawing Sheets

OPTICAL LASER CONTROL FOR OPTICAL COMMUNICATIONS SYSTEMS

FIELD OF THE INVENTION

This invention relates to the control of optical lasers, particularly for use in optical communications systems.

BACKGROUND OF THE INVENTION

Optical lasers are used to provide a modulated light source for optical communication systems. These lasers are designed to have narrow dynamic spectral widths when used in dispersive and/or high data rate systems.

DFB (distributed feedback) lasers are widely used in optical communications systems to produce monomode modulated light output, which is necessary for a narrow linewidth.

Externally modulated lasers operate the laser in a continuous wave (CW) mode, and require the use of expensive external modulators to provide the modulation function. External modulators are typically waveguide-based devices fabricated in lithium niobate or gallium arsenide. The use of external modulation in this way has been required in the past in order to reduce the inherent wavelength chirp of the more simple directly modulated lasers. The cost advantages of using directly modulated lasers have, however, resulted in much research into the use of these devices.

Directly modulated lasers are current-controlled, and the current modulation applied determines the power in the '1' and '0' levels, as well as the output optical frequency. The output is used to define an amplitude modulated signal of a specific frequency without the need for further modulation devices.

There are several sources of non-linearity in a semiconductor laser under modulation.

The basic performance is described by the carrier and photon rate equations given below, which give rise to the damped oscillatory transient response in power and frequency when switching between '0' and '1' levels.

However the presence of non-linearity in the gain mechanism due to intra-band carrier relaxation effects, whereby the gain is not only dependent on the injected carrier density, but also on the photon density or power, gives rise to adiabatic frequency chirp and damping of the laser response.

Additionally the longitudinal non-uniformity in the photon density along the laser cavity gives rise to a longitudinal non-uniformity in carrier density and hence local refractive index, since the presence of injected carriers reduces the refractive index. This, combined with the fixed grating pitch, gives a longitudinal variation in the grating Bragg frequency at which it diffracts light. This effect is known as longitudinal mode spatial hole burning (LMSHB). This means that as the output power is altered, the longitudinal photon, carrier, and refractive index profiles change, and the result is a non-linear variation in the laser output power and frequency with current. Under dynamic conditions, LMSHB can give rise to time constants in the power and frequency response which are related to the carrier lifetime.

Other non-linear effects that can occur include the transverse diffusion of injected carriers from regions of low photon and high carrier density to regions of high photon and low carrier density. Under dynamic conditions the lag associated with the diffusion gives rise to damping.

For timescales of approximately 100 ns-1 µs, the thermal properties of the laser may be important. These are primarily manifested as a frequency chirp associated with the dependence of the refractive index on temperature. If there is a long string of '1s' for example, then the resulting heating in the laser might cause the optical frequency to reduce over a period of ~100 ns.

Conventional current modulation of a directly modulated semiconductor DFB laser between the "0" and "1" current levels results in a damped oscillatory transient response in power and in frequency. The frequency transient is particularly damaging as it gives rise to a dispersion penalty after propagation through standard optical fibers. It has been recognised that these transient effects, which give rise to dynamic line broadening, can be reduced by shaping the leading edge of the laser current control pulse.

Even when the transient effects are reduced, the other non-linearities associated with directly modulated lasers give rise to difficulties in their use in high speed optical communications systems. Any effect that broadens the laser spectrum also gives rise to distortion after transmission through a dispersive medium. Pure amplitude modulation broadens the spectrum, but any frequency chirp associated with transient effects or other non-linearities, will tend to increase the dispersion-induced distortion further. Chromatic fibre dispersion remains a limiting factor in the development of low cost, high data rate and long reach optical communications systems.

There remains a need for an optical communications system which enables low cost implementation using directly modulated lasers and which provides dispersion compensation as well as taking account of the non-ideal characteristics of the directly modulated optical laser used to modulate the optical carrier.

SUMMARY OF THE INVENTION

According to the invention, there is provided an optical communications system, comprising:
 a transmitter;
 a receiver; and
 an optical communications link between the transmitter and receiver
 wherein the transmitter comprises a current-driven directly modulated laser for providing a modulated optical signal and a current controller for controlling the current waveform applied to the laser,
 wherein the current waveform applied to the laser is determined to compensate for the effects of the laser non-linearities and the fiber chromatic dispersion.

This system applies pre-compensation to the directly modulated laser input current waveform to provide both pre-compensation for chromatic dispersion and compensation for the non-linearities of the directly modulated laser. These are two of the main limiting factors in providing a low cost high data rate and long reach optical communications system.

A memory may be used to store current waveform profiles corresponding to different fiber span dispersions, in order to compensate for the fiber span dispersion and the laser non-linearities. For example, a look up table may be used, the data for which is obtained at installation or based on modelling.

The laser may comprise a distributed feedback (DFB) laser.

The laser non-linearities may include the damped oscillatory transient responses in power and/or frequency of the laser, non-linear gain effects, longitudinal mode spatial hole-burning, and thermal effects.

The invention also provides a method of controlling a directly modulated laser in an optical communications system to provide a desired modulated output, comprising:

determining a dispersion of a link over which the output is to be transmitted; and deriving from the dispersion a current waveform for driving the directly modulated laser in order to cause the desired output to reach the end of the link, taking into account the effects of the laser non-linearities and the chromatic dispersion of the fiber of the link.

The invention also provides a transmitter for use in an optical communications system for transmitting optical communications signals over a link, comprising:

a current-driven directly modulated laser for providing a modulated optical signal; and a current controller for controlling the current waveform applied to the laser, wherein the current waveform applied to the laser is determined to compensate for the effects of the laser non-linearities and the chromatic dispersion of the fiber of the link.

BRIEF DESCRIPTION OF THE DRAWINGS

An example of the invention will now be described in detail with reference to the accompanying drawings, in which.

DETAILED DESCRIPTION

Figure 1A:
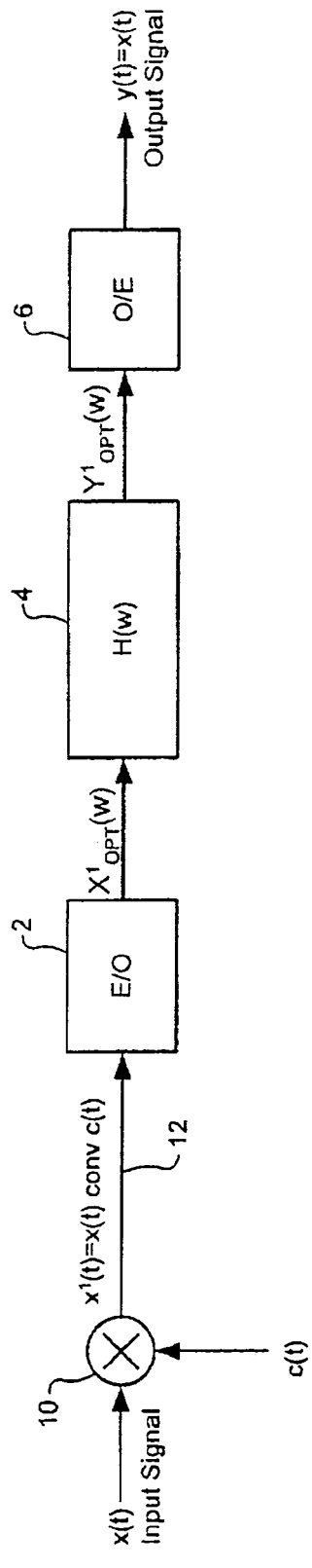
FIGS. 1a and 1b are block diagrams schematically illustrating transmission of an input data signal through an optical communications system proposed by the Assignee and which uses en externally modulated laser.

The Assignee has proposed a system which enables the characteristics of an optical signal to be varied by digital processing of the original laser electrical drive current waveform, in the electrical domain, and also enables analysis of optical signal characteristics electrically. This ability to preprocess or post-process an optical signal in the electrical domain has been proposed in order to enable compensation of optical distortions, most notably chromatic dispersion.

The system is described in US 24067064A, which is hereby incorporated by way of reference material. A description of that system is given below before describing the system of the invention, as the system of the invention can be implemented using many of the concepts embodied in that system.

The optical link between network nodes in a long reach system is typically made up of multiple concatenated optical components, including one or more (and possibly 20 or more) optical fiber spans (e.g., of 40-150 km in length) interconnected by optical amplifiers.

The use of concatenated optical components within a link enables improved signal reach. Optical signals are progressively attenuated as they propagate through a span, and amplified by an optical amplifier (e.g., an Erbium Doped Fiber Amplifier—EDFA) prior to being launched into the next span. However, signal degradation due to noise and the dispersion effects increases as the signal propagates through the fiber.

Mathematically, first order dispersion is the derivative of the (temporal) group delay of the optical path with respect to wavelength. The fibre dispersion coefficient is measured in picoseconds arrival time change per nanometre change in wavelength per kilometre length (ps $nm^{-1}$ $km^{-1}$). The magnitude of waveguide and material dispersions both vary with wavelength, and at some wavelengths the two effects act in opposite senses. The amount of dispersion present in a link can also vary with the temperature of the cable, and if the route is changed (e.g. using optical switches). Dispersion in optical fibers presents serious problems when using light sources whose spectrum is non-ideal, for example broad or multispectral-line, or when high data rates are required, e.g., over 2 GB/s.

One commonly used method of addressing the problem of dispersion in high-bandwidth communications systems is by inserting one or more optical dispersion compensators within a link. Such dispersion compensators may, for example, take the form of a length of fiber, a Mach-Zehnder interferometer, an optical resonator, or a Bragg reflector. Some of these compensators can also produce a controlled variable amount of compensation, which enables mitigation of time-variant dispersion effects. In either case, these compensators are intended to at least partially offset the signal distortions introduced by the system transfer function. The compensation function is a dispersive function that is selected to optimize the performance of the link.

In a fully linear system, the compensation function would preferably be equivalent to the complex conjugate of the optical link transfer function, so that the combined effect would be an undistorted received signal that exactly corresponds to the original transmitted optical signal. However, the limitations of real optical components, and the time-varying amount of compensation required, make this objective very difficult to achieve. Additionally, optical compensators are expensive and introduce significant optical losses. These losses must be offset by means of additional optical gain which introduces more optical noise. The additional (or higher-performance) optical amplifiers required to provide this increased gain further increase the total cost of the communications system. In addition, the presence of optical dispersion compensators and high performance amplifiers distributed along the length of the link provides a significant technical barrier to system evolution.

These problems can be alleviated by moving the compensation function to the terminal ends of the link. This technique typically involves "pre-processing" the input signal at the transmitter end of the link to improve dispersion tolerance, and/or processing the output signal detected at the receiver end of the link to accurately detect the input signal within the distorted output signal.

It is known that the use of a coherent receiver enables the signal degradation due to dispersion to be removed via linear electrical filtering. However, because of their high cost, very few coherent optical receivers have been installed, and the cost of replacing installed receivers with the high-performance coherent receivers has been prohibitive.

The system proposed by the Assignee mentioned above is for compensating optical dispersion, and other optical degradation of a communications signal conveyed through an optical communications system. A compensation function is determined that substantially mitigates the chromatic dispersion imparted to the communications signal by the optical communications system. The communications signal is then processed in the electrical domain using the compensation function.

This approach takes advantage of high speed digital electronic circuitry now available which can operate at speeds sufficient to control the modulation of an optical carrier at rates higher than the optical bit rate, in order to implement pre- or post-compensation. The method can be implemented at either the transmitter or receiver ends of the communications system, or may be divided between both ends, as desired.

When the method is implemented in the transmitter, pre-distortion is applied using digital filtering based on a compensation function to generate the pre-distorted signal from the original electrical input signal. The pre-distorted signal is then used to modulate an optical source to generate a corresponding pre-distorted optical signal for transmission through the optical communications system. The pre-distorted signal can then incorporate compensation for dispersion and component non-linearities throughout the system. Consequently, dispersion compensation can be effectively implemented independently of the type of detection (i.e. direct or coherent) used in the receiver.

The system proposed by the Assignee for providing digital electrical processing for compensation of optical effects will first be described. This invention extends the capability provided by the proposed system in order to provide compensation for the optical laser modulation characteristics of a directly modulated laser, thereby enabling low cost modulation equipment to be used with compensation for the performance penalty.

Figure 1B:
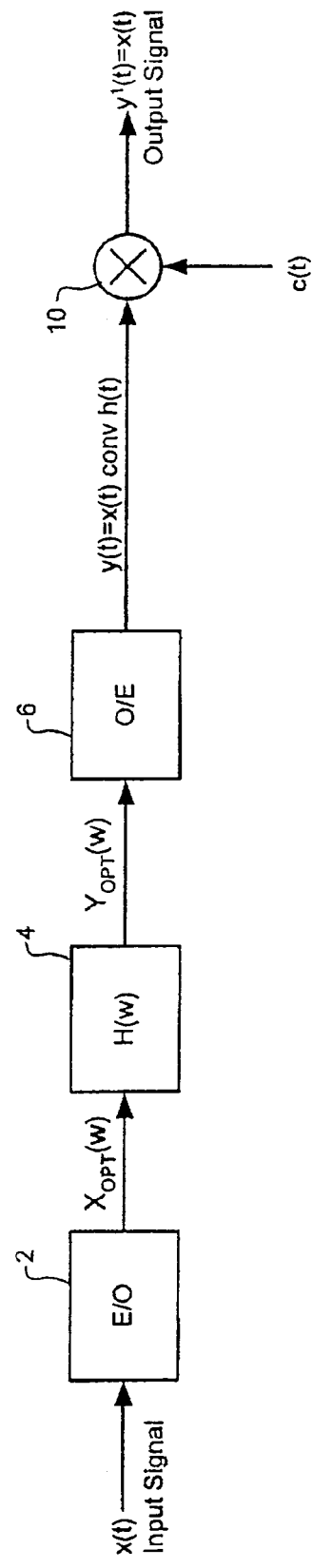

FIGS. 1a and 1b are block diagrams schematically illustrating principal operations of the proposed system for providing chromatic dispersion compensation. FIG. 1a shows an embodiment in which dispersion compensation is implemented at the transmitting end of the communications system. Conversely, FIG. 1b illustrates an embodiment in which dispersion compensation is implemented at the receiving end of the communications system.

As shown in FIG. 1a, the optical communications system is represented by electrical-to-optical (E/O) and optical-to-electrical (O/E) converters 2 and 6 separated by an optical link 4 represented by a system transfer function H(w). The E/O and O/E converter blocks 2 and 6 shown in FIG. 2 have been considered to be ideal, in the sense that they do not introduce any signal distortions that are not otherwise accounted for by the system transfer function H(w). Signal distortions introduced by the system transfer function are compensated by deriving a compensation function c(t) that optimizes system performance. For chromatic dispersion, for example, the compensation function c(t) will be equivalent to the complex conjugate H*(w) of the system transfer function H(w).

In non-linear systems, the compensation function c(t) will be non-linear, but in all cases, the compensation function is selected to optimize system performance. A compensation filter 10 uses the compensation function c(t) to filter the input signal x(t) in the electrical domain, thereby producing a pre-distorted input signal $x^1(t)$ 12 given by:

$$x^1(t) = x(t) \text{conv} \, c(t) \quad (1)$$

where "conv" is the convolution (compensation) function.

The pre-distorted input signal $x^1(t)$ 12 is then converted to a corresponding pre-distorted optical signal $X^1_{OPT}(w)$ by the E/O converter 2 and transmitted through the optical link 4 to the receiver. Within the receiver, the incoming optical signal $Y^1_{OPT}(w)$ is converted by the O/E converter 6 into a corresponding output signal y(t). As may be seen in FIG. 1, the received optical signal $Y^1_{OPT}(w)$ is the pre-distorted optical signal $X^1_{OPT}(w)$ multiplied by the transfer function H(w) of the optical communications system. Because the distortions introduced by the compensation function c(t) exactly counterbalance those introduced by the system transfer function H(w), the output signal y(t) generated by the O/E converter will be a substantially undistorted version of the original input data signal x(t). Thus, a technique of compensating optical distortions impressed upon optical signals traversing the optical link 4 is provided, by pre-distorting the input data signal x(t) within the electrical domain at the transmitting end of the optical link 4. Because distortion compensation is accomplished in the electrical domain, a substantially arbitrary compensation function c(t) can be implemented, thereby facilitating effective compensation of even severe optical dispersion.

Figure 2:
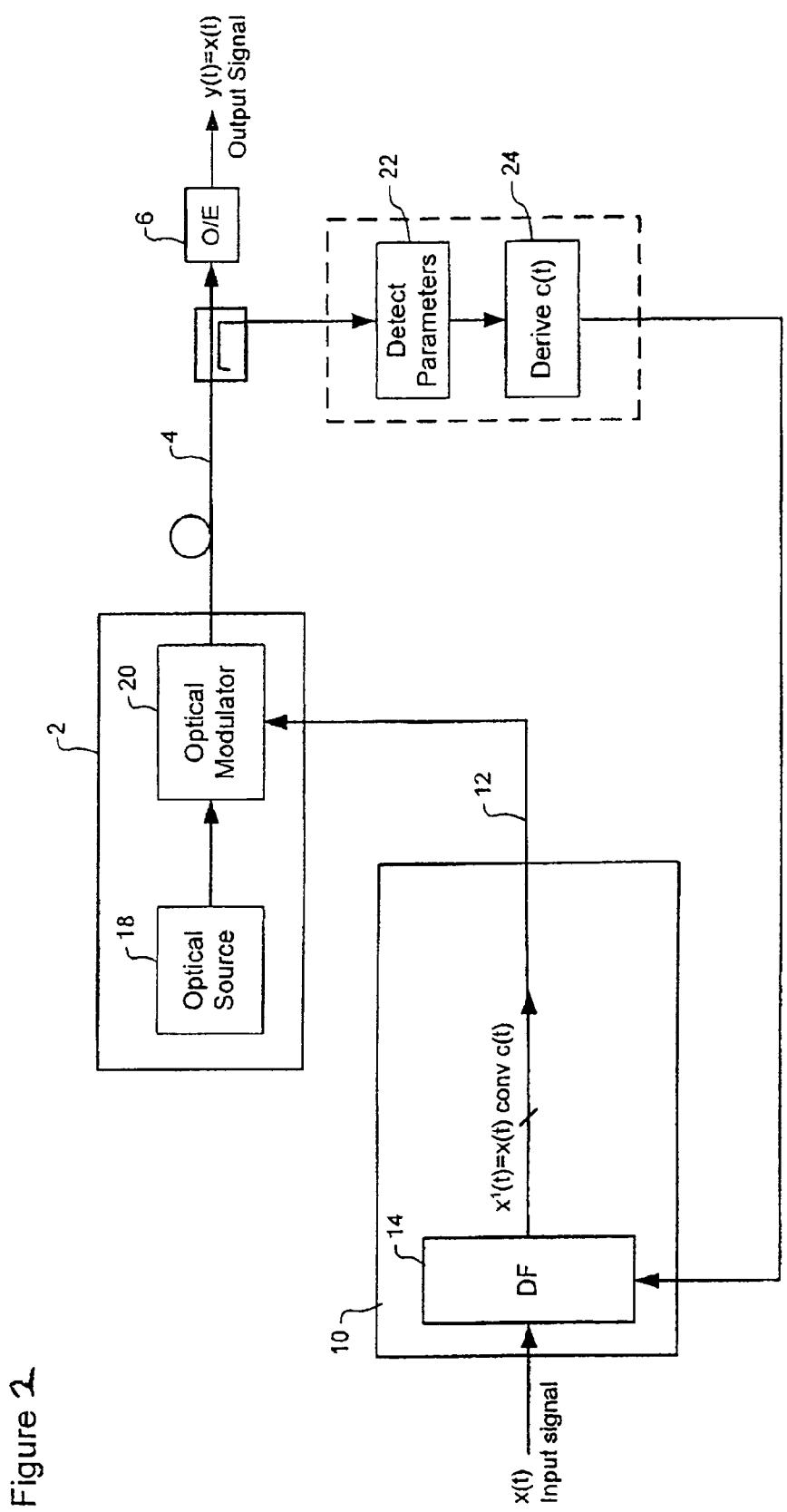
FIG. 2 is a block diagram schematically illustrating principal components and operations of a compensation modulator used in the system of FIG. 1.

FIG. 2 is a block diagram schematically illustrating principal elements and operations of a first example of compensation modulator 10. As shown in FIG. 2, the input signal x(t) is filtered by a digital filter 14 which accepts the compensation function c(t) as an input. Various known digital filter types may be used to implement the digital filter 14, such as, for example, Finite Impulse Response (FIR) filters, Infinite Impulse Response (IIR) filters, and Fast Fourier Transform (FFT filters). Alternatively, the digital filter 14 may be implemented using a Random Access Memory Look-up Table (RAM LUT), as will be described in greater detail below. In either case, the digital filter 14 generates the pre-distorted signal $x_1(t)$ 12, which compensates for chromatic dispersion due to the system transfer function H(w).

The pre-distorted signal x'(t) 12 can then be converted into the corresponding pre-distorted optical signal $X^1_{OPT}(w)$ by means of a conventional electrical to optical converter 2. For example, in the illustrated embodiment, electrical to optical conversion is accomplished using a tuned optical source 18 such as a narrow band laser coupled to a conventional optical modulator 20. In this case, the pre-distorted signal 12 can be used as an input to control the optical modulator 20 in a manner known in the art.

Figure 3:
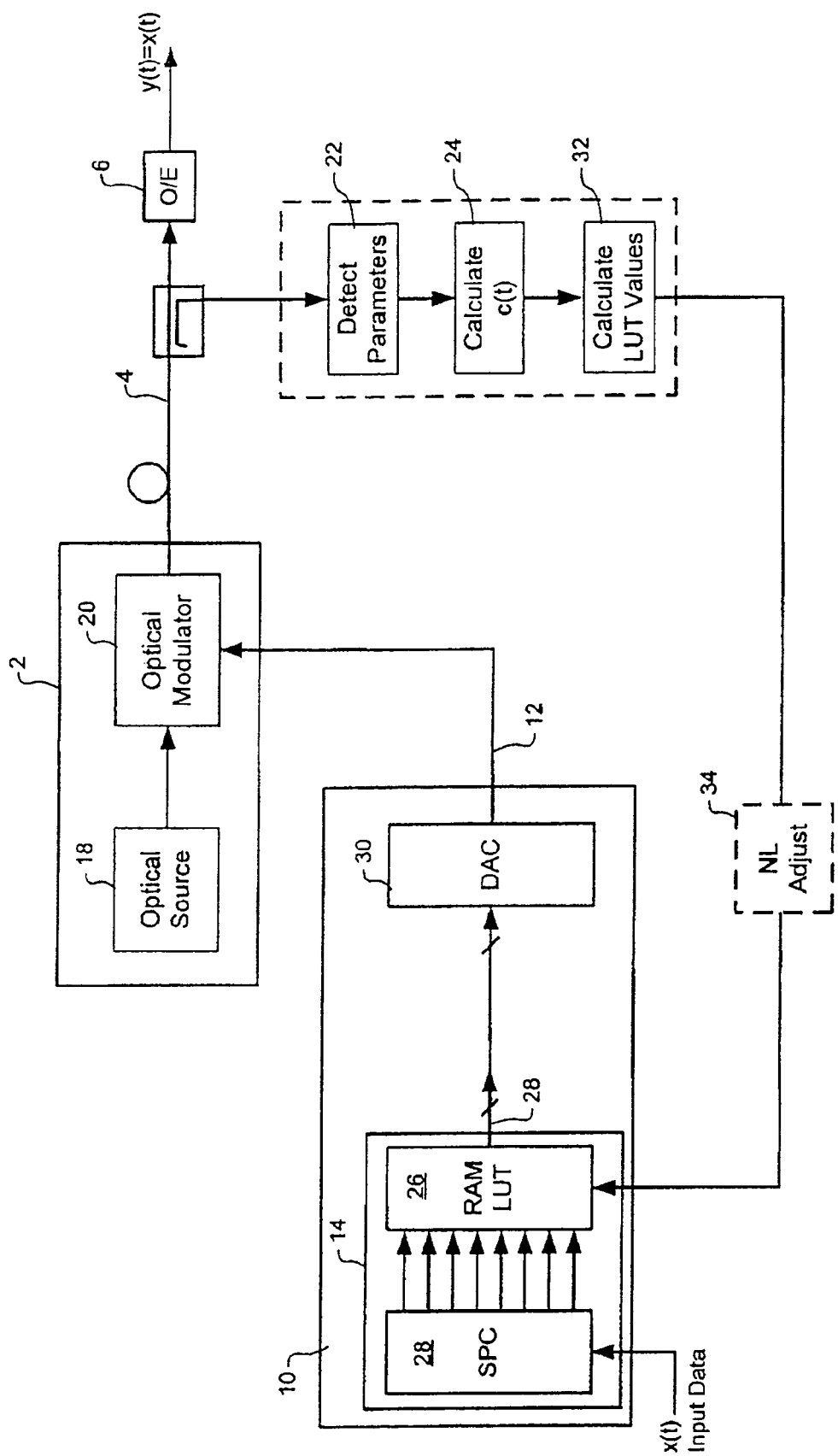
FIG. 3 is a block diagram schematically illustrating principal components and operations of an alternative compensation modulator used in the system of FIG. 1.

The system previously proposed by the Assignee of US 24067064A uses an externally modulated laser as shown in FIGS. 2 and 3, with separate optical source 18 and modulator 20.

Various methods may be used to derive the compensation function c(t). In the example of FIG. 2, the optical signal $Y^1_{OPT}(w)$ at or near the receiver end of the optical link 4 is monitored (at 22) in order to detect signal quality parameters indicative of dispersion in the optical communications system. In preferred embodiments, the signal quality parameters comprise a direct measurement of dispersion as a function of wavelength across the wavelength band of interest. However, other signal quality parameters such as, for example, the bit error rate or eye closure may be used as proxies for the dispersion. Any of the signal quality parameters may be detected based on an optical signal obtained by tapping the optical link 4 as shown in FIG. 2, or alternatively by analysis of the output signal y(t) generated by the E/O converter 6. A compensation function c(t) which optimizes the detected parameters can then be derived (at 24) deterministically and/or adaptively, using known techniques.

The functional step of deriving the compensation function c(t) can be implemented by any suitable combination of hardware and software, which may be co-located with the receiver, the transmitter, or any other location. In embodiments in which the detected parameters comprise direct measurement of dispersion, the compensation function c(t) can be calculated to minimize (and preferably eliminate) the total dispersion. Where bit error rate and/or eye closure are used as proxies, then the compensation function c(t) would be calculated to optimize these respective values.

The system may also be used to compensate for other non-linear effects. Of particular concern in considering non-linear processes are the effects of phase nonlinearities such as self phase modulation in optical fibers, which increase as data rates and optical power levels increase, and which ultimately limit both system performance and signal reach.

As mentioned above, the digital filter 14 may be implemented in a variety of ways. FIG. 3 schematically illustrates an embodiment in which the digital filter 14 is implemented using a RAM LUT 26. This technique exploits the fact that the input signal x(t) is a substantially undistorted binary signal, in which successive bits can be unambiguously discriminated. This greatly simplifies the problem of digitally filtering the input signal x(t), because a direct relationship can be defined between the input signal x(t) and the pre-distorted signal $x^1(t)$ 12.

As shown in FIG. 3, successive bits of the input signal x(t) are latched through a serial-to-parallel converter 28 (e.g., a shift register) which converts the serial bit stream into a parallel bit stream having a width of N bits. In the illustrated embodiment N=8, it being understood that other values of N may be used as desired. The parallel data stream is then used to access a random access memory (RAM) look-up table 26 having $2^N$ registers (not shown).

Because the RAM LUT 26 performs a substantially linear filtering function, it is possible to construct the LUT 26 as a set of two or more Random Access Memory blocks (not shown), if desired. In this case, each RAM block stores a respective portion of the desired numerical value 28 of the pre-distorted signal component. Thus the outputs generated from each RAM block can be summed, in a conventional manner, to produce the desired numerical value 28. This arrangement allows the LUT 26 to be larger than can conveniently be accommodated within a single RAM block.

Each register of the look-up table 26 contains at least one digital number representing the analogue value of the pre-distorted signal $x^1(t)$ 12, which has been previously calculated for a unique set of N bits. Accordingly, as the input serial bit stream is latched through the serial-to-parallel converter 14, a stream of successive digital values 28 of the pre-distorted signal 12 are output from the look-up table 26.

This stream of digital values 28 can then be converted into the corresponding analogue pre-distorted signal $x^1(t)$ 12 using a digital-to-analogue converter 30. The analogue pre-distorted signal $x^1(t)$ 12 can then be converted into the corresponding pre-distorted optical signal $X^1_{OPT}(w)$ by means of a conventional electrical to optical converter 2, as described above.

Various methods may be used to calculate each of the digital values stored in the look-up table 26. In the example of FIG. 3, the optical signal at or near the receiver end of the optical link 4 is monitored (at 22) to detect signal quality parameters and a compensation function c(t) which optimizes the detected parameters derived (at 28), as described above with respect to FIG. 2.

Because chromatic dispersion causes a time domain distortion of an input signal, the instantaneous value of the analogue pre-distorted input signal 12 at a particular instant (t) will necessarily be a function of the analogue waveform of the input data signal x(t) within a time window that brackets the instant in question. The width of the time window, measured in symbols, will generally be a function of the maximum dispersion $(D_M)$ for which compensation is to be provided; the bandwidth (B) of the optical signal; and the symbol interval (S) of the optical signal. For example, consider an optical communications system in which the transmitter generates an optical signal having a bandwidth of B nanometers and a symbol interval of S picoseconds/symbol. In this case, the maximum net dispersion $(D_M)$ that can be compensated is given by the equation:

$$D_M = N \cdot \frac{S}{B}, \qquad (2)$$

where N is the width of the time window, measured in symbols. It will be appreciated that the selected value of N will limit the maximum dispersion $(D_M)$ that can be effectively compensated. In general, the value of N will be selected based on the expected maximum dispersion of the optical communications system.

In the example of FIG. 3, the look-up table uses N=8 successive bits of the input signal x(t) to reference successive values of the pre-distorted signal. In this case, the time window used for calculating each value of the pre-distorted signal spans a total of N=8 symbols, so that the total dispersion that can be compensated by the system of FIG. 2 will be given by:

$$D_M = 8 \cdot \frac{S}{B} \qquad (3)$$

Following the discussion above, it will be seen that each value stored in the look-up table 26 can readily be calculated (at 32) by applying the calculated compensation function to each one of the $2^N$ possible N-bit sequences. For each N-bit sequence, the calculated look-up table value would then be stored in the RAM look-up table 26 register that is indexed by the N-bit sequence in question. This process will result in the look-up table 26 being loaded with pre-calculated values of the pre-distorted signal 12 which will be accessed, in sequence, as successive bits of the input data signal x(t) are latched through the serial-to-parallel converter 14.

In some instances, it may be advantageous to arrange the RAM LUT 26 to output more than one numerical value 18 of the pre-distorted signal 12 for each symbol of the input signal x(t). This can readily be accomplished by calculating the required numerical values 18 for each N-bit sequence, and storing the resulting set of numerical values in the appropriate register. Consequently, as each bit of the input signal x(t) is latched through the serial-to-parallel converter 28, all of the numerical values calculated for each unique N-bit sequence will be output, in an appropriate sequence, from the RAM LUT 26.

In the embodiments of FIGS. 2 and 3, a single compensation modulator path is provided for generating the pre-distorted signal $x^1(t)$ 12 based on the input signal x(t). As will be appreciated, such an arrangement is suitable for modulating a single dimension (e.g., either amplitude or phase) of the input data stream x(t). Accordingly, the pre-distorted signal $x^1(t)$ 12 of the embodiments of FIGS. 2 and 3 will comprise an amplitude or phase modulated version of the original input data stream x(t).

The system described above provides the ability to compensate for optical degradation across a network by pre-processing the signal in the electrical domain before modulation onto an optical carrier, or post processing the signal in the electrical domain after demodulation.

This invention relates specifically to the optical modulator characteristics, and the compensation for the non-ideal characteristics of a directly modulated laser using a pre-compensation approach. This enables the design of a very low cost 10 Gb/s regional transmission system. Dispersion limited system reaches of up to 600 km on mixed fiber types are of particular interest.

In accordance with the invention, the transmitter comprises a current-driven directly modulated laser for providing a modulated optical signal and a current controller for controlling the current waveform applied to the laser. The current waveform applied to the laser is determined to compensate for the effects of the laser non-linearities and the fiber chromatic dispersion.

Figure 4:
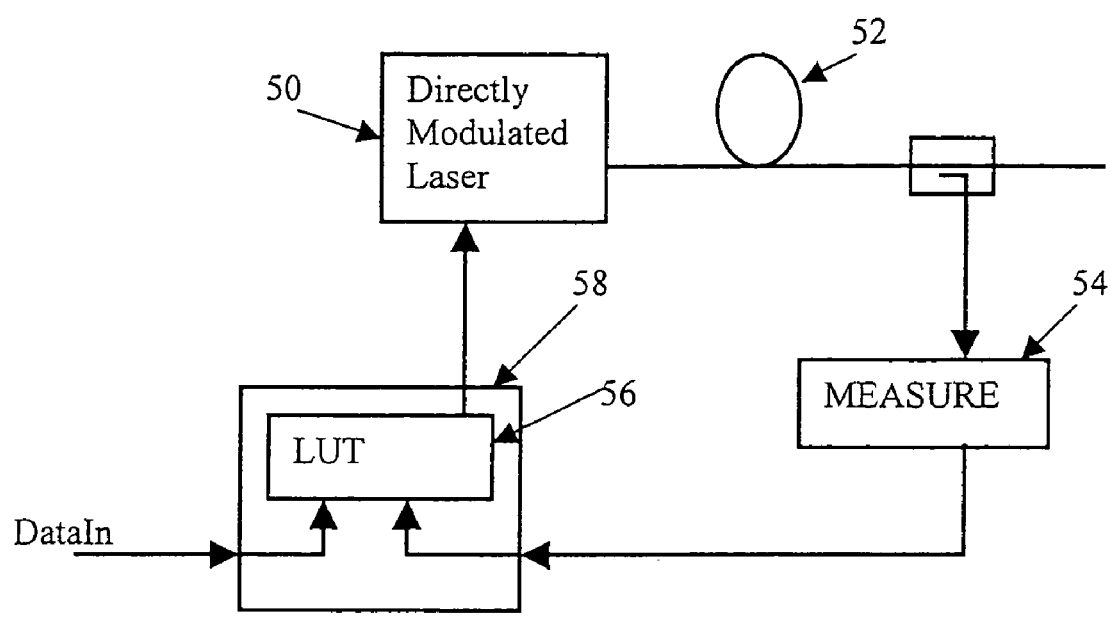
FIG. 4 is a block diagram of an optical communications system of the invention.

FIG. 4 shows a system in accordance with the invention.

The system comprises a directly modulated laser 50 providing a laser output to an optical fiber link 52.

In the same way as described for the system already proposed by the Assignee, the chromatic dispersion of the link 52 is measured or calculated based on measured parameters by unit 54.

The obtained chromatic dispersion is then used to address a look up table 56 forming part of the laser drive apparatus 58. This look up table is again addressed using a number of bits of the input data stream "DataIn" as well as the obtained chromatic dispersion value. The look up table 56 provides a laser current drive waveform which compensates for the chromatic dispersion in the link 52 as well as compensating for the non-linear characteristics of the directly modulated laser.

The non-linear characteristics of the laser modulator comprise at least the transient ringing in power or frequency at the output of the laser. The look up table may also compensate for other non-linear effects of the laser modulator characteristics, such as non-linear gain related effects, and longitudinal mode spatial hole burning.

The invention thus provides pre-compensation of the laser drive current, to take account of the laser characteristics and the dispersion of the fiber link.

The control of the current signal applied to the directly modulated laser can be used to provide compensation for all non-linear effects of the laser.

A first undesirable characteristic of the laser which can be compensated by the scheme of the invention is the damped oscillatory transient in frequency and power in the laser output signal. This transient can be removed by solving a simplified version of the laser carrier and photon rate equations 'backwards' in order to force a certain frequency response. The simplified single mode rate equations, including linear, bimolecular and Auger carrier recombination, incorporating non-linear gain or gain saturation but ignoring longitudinal mode spatial hole burning, are as follows:

$$\frac{dN}{dt} = \frac{J}{ed} - \frac{N}{\tau} - B \cdot N^2 - C \cdot N^3 - \frac{G(N-N_t)\phi}{(1+\varepsilon\phi)} \quad (4)$$

-continued
$$\frac{d\phi}{dt} = \frac{\Gamma G(N-N_t)\phi}{(1+\varepsilon\phi)} - \frac{\phi}{\phi_p} \quad (5)$$

where the symbols have the following meanings:

B bimolecular carrier recombination coefficient (spontaneous emission)

C Auger carrier recombination (non-radiative recombination)

D active region thickness e electronic charge

G linear gain coefficient

J injected current density per unit area

N carrier density $N_t$ transparency carrier density

T time $\epsilon$ non-linear gain coefficient $\Gamma$ vertical mode confinement factor $\Phi$ photon density $\tau$ linear carrier recombination time (non-radiative recombination)

$\tau_p$ photon lifetime

The frequency of emission of a directly modulated laser is controlled by the refractive index of the active region, which is in turn controlled by the carrier density. Controlling the temporal carrier density response can be used to obtain a desired frequency response.

Figure 5:
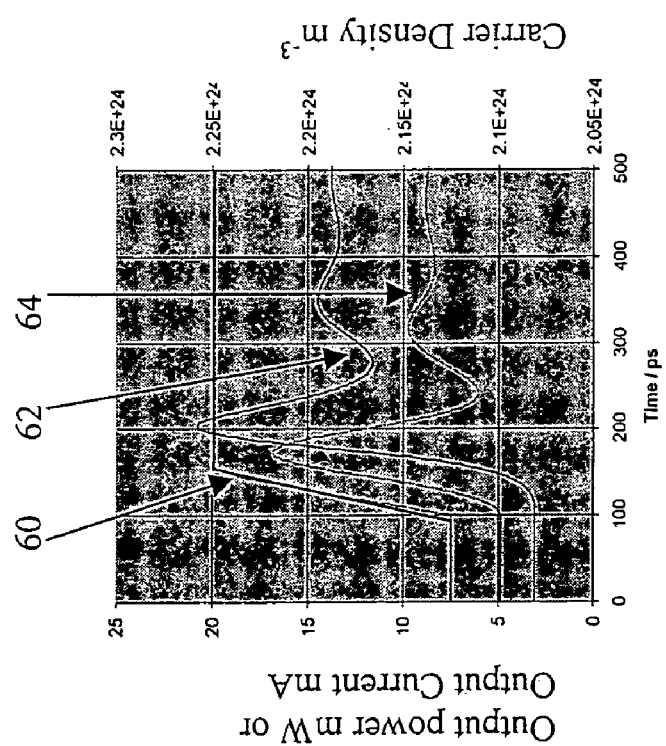
FIG. 5 shows the standard response of a directly modulated laser to a step increase in drive current.

FIG. 5 shows the conventional carrier and photon response in response to a step increase in current. Plot 60 shows the step increase in current, plot 62 shows the output power, and plot 64 shows the carrier density which determines the frequency or wavelength.

The solution of these equations to give a step change in frequency involves the application of a pre-biasing initial pulse in the drive current waveform, and this is one feature which can be used in the system of the invention.

Figure 6:
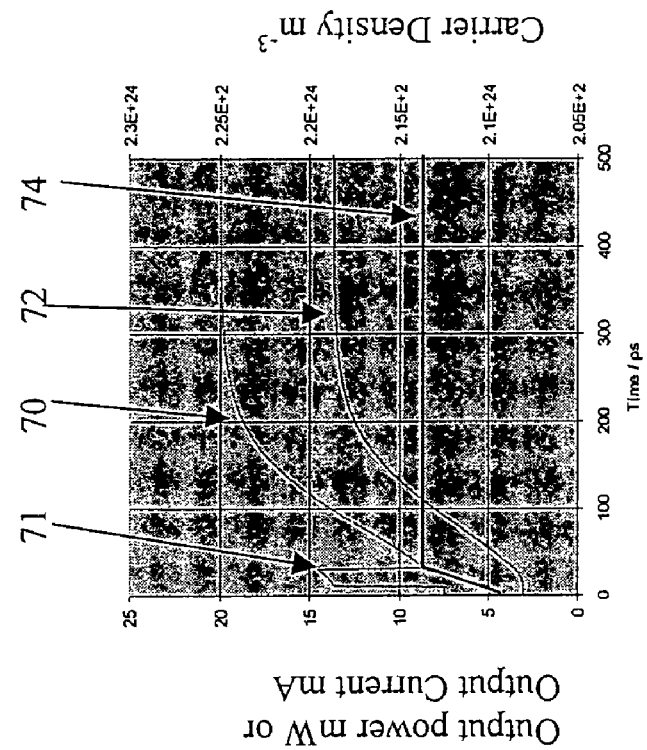
FIG. 6 shows the response of a directly modulated laser to a more complex current waveform, that gives rise to an overall increase in drive current, which can be produced by the system of the invention.

FIG. 6 shows the carrier and photon response in response to an increase in current using a modified profile. Plot 70 shows the current profile, in which a pre-biasing pulse 71 is superimposed on the step increase in current. The introduction of a short pre-biasing current pulse 71 is followed by a slower rise in current. The short current pulse 71 raises the carrier density to the steady-state '1' level, while the following slower rise in current maintains the carrier density fixed, in the presence of non-linear gain, as the photon density rises to the steady-state '1' level. Plot 72 shows the output power and plot 74 shows the carrier density.

Figure 7:
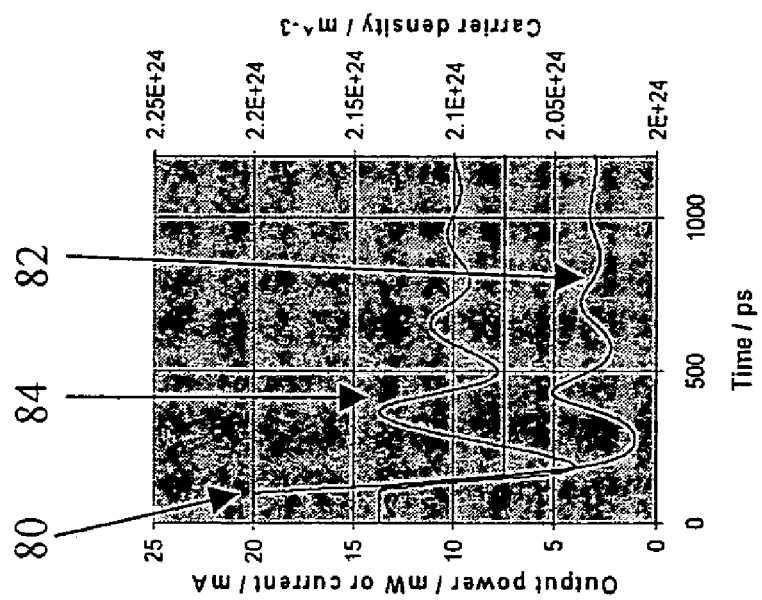
FIG. 7 shows the standard response of a directly modulated laser to a step decrease in drive current.

FIG. 7 shows the conventional carrier and photon response in response to a step decrease in current. Plot 80 shows the step decrease in current, plot 82 shows the output power and plot 84 shows the carrier density.

The solution of these equations to give a step change in frequency again involves the application of a pre-biasing initial pulse in the drive current waveform.

Figure 8:
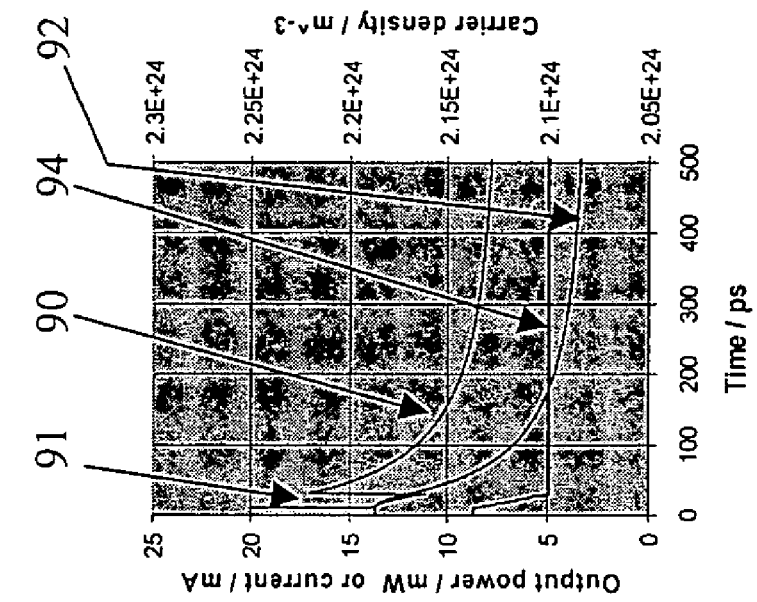
FIG. 8 shows the response of a directly modulated laser to a more complex current waveform, that gives rise to an overall decrease in drive current which can be produced by the system of the invention.

FIG. 8 shows the carrier and photon response in response to a decrease in current using a modified current waveform. Plot 90 shows the current waveform, in which a pre-biasing notch 91 is superimposed on the step decrease in current. Plot 92 shows the output power and plot 94 shows the carrier density.

Figure 9A:
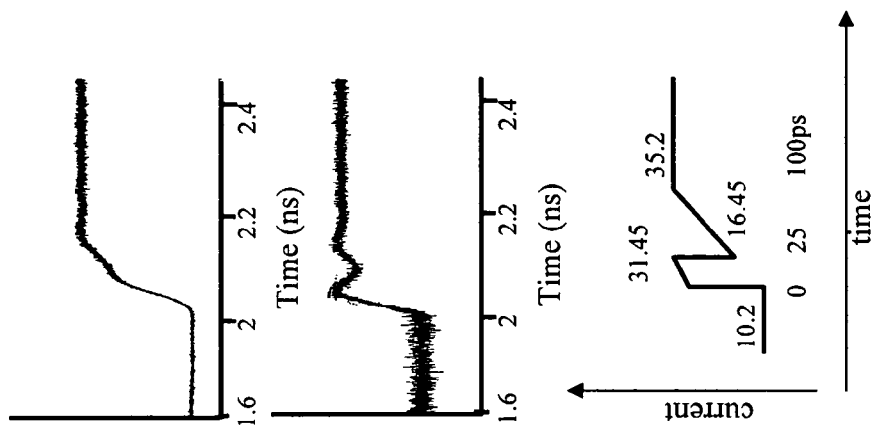
FIGS. 9a to 9c show the power and frequency response of a laser for a conventional step increase in current, and for two different current waveforms of the invention, for comparative purposes.
Figure 9B:
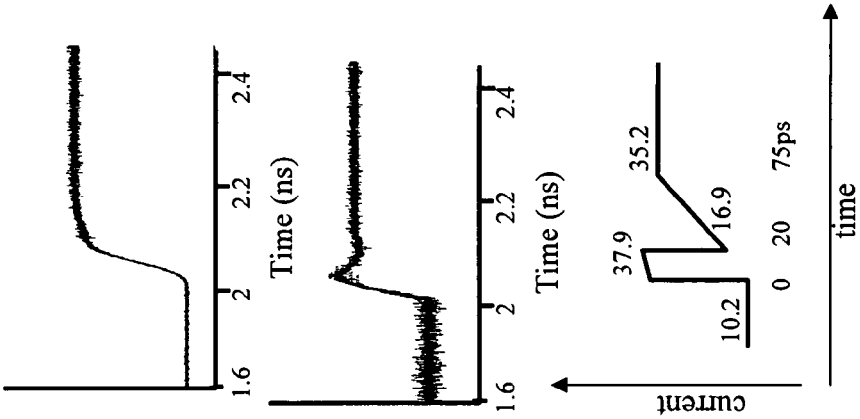
Figure 9C:
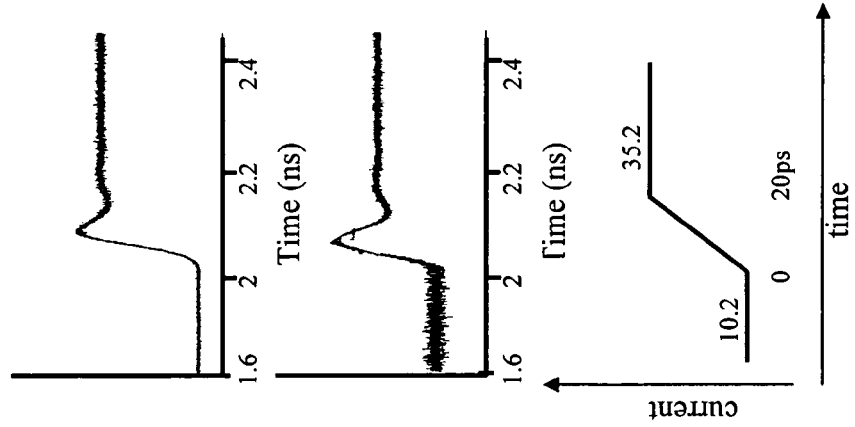

The use of these pre-biasing pulses gives rise to a significant reduction in ringing in power and frequency. FIG. 9 shows the power and frequency response for a conventional step change in drive current (FIG. 9a), for a first current waveform of the invention using a 20 ps pre-bias pulse and with a total risetime of 75 ps (FIG. 9b) and for a second current waveform of the invention using a 25 ps pre-bias pulse (FIG. 9c) and with a total risetime of 100 ps. The top plot in each Figure shows the output power and the middle plot shows the output frequency (in relative terms) for the current waveform shown in the bottom plot.

The modification of the current drive waveform for the directly modulated laser in this way enables the required optical signal to noise ratio (OSNR) at the receiver to be reduced for a given bit error ratio. In particular, a given required optical signal to noise ratio can be achieved over a much wider range of dispersion, so that the system is tolerant to greater dispersion, and can therefore be used to implement a longer reach system.

The current waveform can be generated by real time solutions of the simplified laser rate equations, or more preferably using a pre-calculated look up table.

This invention provides pre-compensation of the laser drive current to provide compensation both for the non-linearities of the laser characteristics, some of which are investigated above, and also the dispersion in the link.

The effect of chromatic dispersion in the link will vary depending on the bit sequence being transmitted. For this reason, the look up table is addressed using the total dispersion of the link and the bit sequence, in order to provide the required laser drive current for that bit sequence. For example, the look up table may be addressed using an 8 bit sequence together with a dispersion value.

The total dispersion for fixed links can be measured and surveyed. If dynamic dispersion compensation is to be implemented to account for switching in the network, then the differential delay between two optical frequencies could be monitored. Alternatively, broad spectrum emission from an LED could be launched into the fiber and a modulated tone superimposed—the minima in the detected amplitude versus frequency would give a measure of dispersion.

The look up table is addressed with a number of bits, as explained above. However, the look up table is addressed for each new bit. For each new bit, an address is generated from the (for example) 8 bit sequence and the LUT is interrogated at that address.

If only 1 output sample/bit is being generated, then there would be only one entry in the LUT at each address. However it maybe desirable to generate 2 samples/bit to obtain a wider bandwidth drive waveform for the laser, which would mean that there were 2 output samples/bit, and conceivably there might be more samples/bit. The number of bits in the LUT needs to be large enough to allow for the spread in delay through the entire system across the signal bandwidth. In other words, the spread in delay due to the laser non-linearities, the fiber dispersion, and any filters in the system, needs to be substantially accommodated in the (say) 8 bit sequence. At 10 Gb/s, the bits are 100 ps long so 8 bits corresponds to 800 ps differential delay.

Although the calculation of a compensation function is possible (as described above for the system previously proposed by the Assignee), the invention is preferably implemented without real time calculation of a compensation function. The calculation of the compensation function is complicated by the need to simulate the laser performance. Instead, the look up table can be addressed using the bit sequence and the measured or estimated total dispersion of the link. A number of ranges of the dispersion value can be then defined, and this will influence the size of the look up table. The number of different ranges of dispersion that would be required will depend on the system specification and on the required optical signal to noise ratio for a given error ratio at the receiver.

The invention has been described above as enabling compensation for dispersion and the non-linearities of the low cost direct modulation laser. These are the predominant limitations to the implementation of low cost long reach high data rate systems. However, the compensation scheme provided by the invention can provide compensation for additional effects which alter the characteristics of the optical signal during transmission. These may include interference effects between multiple channels carried over a fiber or second order effects.

Some of these additional effects are described in more detail in US 24067064A, referred to above.

The invention has been described in connection with a system using a simple single-bit receiver. There are proposals for multiple bit receivers which have signal processing capability. One example of such a receiver is known as the "Maximum Likelihood Sequence Estimator". This system operates by distinguishing between all sequences which can be observed by an n bit receiver. The pre-compensation system of the invention can then be operated to minimise the uncertainty in deciding the transmitted bit sequence given the received signal waveform. This is a slightly different approach to that of minimising the uncertainty in individual received bits.

The invention can thus compensate for dispersion, for the non-linearities of the directly modulated laser and to provide a signal waveform at the receiver which is most suited for the signal processing operation to be carried out at the receiver.

Various other modifications will be apparent to those of ordinary skill in the art.

I claim:

1. An optical communications system, comprising:
   a transmitter;
   a receiver; and
   an optical communications link between the transmitter and receiver,
   wherein the transmitter comprises a current-driven directly modulated laser for providing a modulated optical signal and a current controller for controlling a current waveform applied to the laser, wherein the current waveform is derived by accessing stored values from a memory corresponding to different fiber span dispersions;
   wherein the output of the directly modulated laser comprises an amplitude modulated signal of a specific frequency without further modulation devices,
   wherein the current waveform applied to the laser is determined to compensate for the effects of the laser non-linearities and the fiber chromatic dispersion and to compensate for damped oscillatory transient responses in at least one of power and frequency of the laser.

2. A system as claimed in claim 1, wherein the memory comprises a look up table.

3. A system as claimed in claim 2, wherein the look up table stores multiple current drive values for each bit of the optical signal.

4. A system as claimed in claim 1, wherein the memory stores current drive values associated with different sequences of optical bits to be transmitted.

5. A system as claimed in claim 1, wherein the laser comprises a distributed feedback (DFB) laser.

6. A system as claimed in claim 1, wherein the laser waveform applied to the laser is determined to compensate for non-linear gain related effects of the directly modulated laser.

7. A system as claimed in claim 1, wherein the laser waveform applied to the laser is determined to compensate for longitudinal mode spatial hole burning of the directly modulated laser.

8. A method of controlling a directly modulated laser in an optical communications system to provide a desired modulated output, comprising:
    determining the dispersion of a link over which the output is to be transmitted by accessing values stored in a memory; and
    deriving from the dispersion a current waveform for driving the directly modulated laser in order to cause the desired output to be obtained at the end of the link, taking into account the effects of the laser non-linearities and the chromatic dispersion of the fiber of the link wherein the transmitter comprises a current-driven directly modulated laser for providing a modulated optical signal and a current controller for controlling the current waveform applied to the laser, the current waveform being determined to compensate for damped oscillatory transient responses in at least one of power and frequency of the laser;
    wherein the output of the directly modulated laser comprises an amplitude modulated signal of a specific frequency without further modulation devices.

9. A method as claimed in claim 8, wherein accessing the stored values comprises accessing a look up table.

10. A transmitter for use in an optical communications system for transmitting optical communications signals over a link, comprising:
    a current-driven directly modulated laser for providing a modulated optical signal; and
    a current controller for controlling the current waveform applied to the laser;
    wherein the current waveform applied to the laser is determined to compensate for the effects of the laser non-linearities, the chromatic dispersion of the fiber of the link, and for damped oscillatory transient responses in power and/or frequency of the laser, the current waveform being derived by accessing stored values corresponding to different fiber span dispersions;
    wherein the output of the directly modulated laser comprises an amplitude modulated signal of a specific frequency without further modulation devices.

* * * * *